United States Patent
André, Sr.

[11] Patent Number: 5,976,339
[45] Date of Patent: *Nov. 2, 1999

[54] METHOD OF INCREMENTAL LAYERED OBJECT FABRICATION

[76] Inventor: Larry Edward André, Sr., 812 Saddlebrook Dr., Bedford, Tex. 76021

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/822,059

[22] Filed: Mar. 24, 1997

Related U.S. Application Data

[63] Continuation-in-part of application No. 08/476,269, Jun. 7, 1995, Pat. No. 5,614,075, which is a continuation of application No. 08/131,205, Oct. 1, 1993, Pat. No. 5,435,902.

[51] Int. Cl.⁶ ..................................................... C25D 1/10
[52] U.S. Cl. .......................... 205/70; 205/67; 264/40.1; 264/22
[58] Field of Search .............. 205/67, 70; 264/22, 264/40.1; 427/595, 248.1

[56] References Cited

U.S. PATENT DOCUMENTS

| | | | |
|---|---|---|---|
| Re. 34,862 | 2/1995 | Czor | 205/67 |
| 4,098,652 | 7/1978 | Koenig | 204/4 |
| 4,169,017 | 9/1979 | Burkey et al. | 204/4 |
| 4,534,831 | 8/1985 | Inoue | 204/4 |
| 4,961,154 | 10/1990 | Pomerantz et al. | 364/522 |
| 5,031,120 | 7/1991 | Pomerantz et al. | 364/522 |
| 5,059,566 | 10/1991 | Yamane et al. | 156/64 |
| 5,109,589 | 5/1992 | Cramer et al. | 29/527 |
| 5,121,329 | 6/1992 | Crump | 364/468 |
| 5,126,529 | 6/1992 | Weiss et al. | 219/121.6 |
| 5,141,680 | 8/1992 | Almquist et al. | 264/22 |
| 5,167,882 | 12/1992 | Jacobine et al. | 264/22 |
| 5,174,943 | 12/1992 | Hull | 264/308 |
| 5,435,902 | 7/1995 | Andre, Sr. | 205/67 |
| 5,545,367 | 8/1996 | Bae et al. | 264/401 |
| 5,614,075 | 3/1997 | Andre, Sr. | 205/67 |

OTHER PUBLICATIONS

Rapid Prototyping and Manufacturing, P. Jacobs et al (Society of Manufacturing Engineers) pp. 397–423, USA, 1992.
W.H. Prine, "Electroforming Difficult Shapes"; Product Engineering; vol. 19, No. 12, pp. 86–89; Dec. 1948.

*Primary Examiner*—Kathryn Gorgos
*Assistant Examiner*—Erica Smith-Hicks
*Attorney, Agent, or Firm*—Mark D. Perdue; Max Ciccarelli

[57] ABSTRACT

The dimensional boundaries of a part are determined in a computer CAD/CAM system, including x, y, and z dimensions. A reference surface is provided and a first incremental layer of mold material is formed on the reference surface. The first incremental layer of mold material is selectively interrupted to define at least one dimensional boundary of the object. A first incremental layer of object material is formed upon at least the reference surface and assumes the dimensions defined by the interruption in the layer of mold material. The steps of forming incremental layers of mold and object material are repeated until the object or part is fully fabricated and all dimensional boundaries are defined.

82 Claims, 5 Drawing Sheets

METHOD OF INCREMENTAL LAYERED OBJECT FABRICATION

CROSS-REFERENCE TO RELATED APPLICATIONS

This application is a continuation-in-part of application Ser. No. 08/476,269 filed Jun. 7, 1995, now U.S. Pat. No. 5,614,075, which is a continuation of application Ser. No. 08/131,205 filed Oct. 1, 1993, now U.S. Pat. No. 5,435,902.

BACKGROUND OF THE INVENTION

1. Field of the Invention

The present invention relates generally to methods for fabricating three-dimensional objects. More specifically, the present invention relates to a method for fabricating three-dimensional objects in incremental layers employing data generated in a CAD/CAM system, the method steps being controlled by a central computer or distributed data processing system.

2. Background Information

Recently, there have been great strides in technology relating to rapid prototyping and manufacturing ("RP&M"), particularly to the integration of CAD/CAM ("Computer Aided Design/Computer Aided Manufacturing") systems into the object fabrication process beyond simple object design and drafting. A goal of this technology is to obtain a final or near-final three-dimensional object or part from CAD/CAM data with as little human intervention as possible. A comprehensive discussion of the state of the RP&M art is found in *Rapid Prototyping and Manufacturing*, P. Jacobs et al. (Society of Manufacturing Engineers, 1992). Another useful reference discussing the state of the art is found in *Automated Fabrication: Improving Productivity in Manufacturing*, M. Burns (PTR Prentice Hall, 1993).

One technology that has received a great deal of attention in this regard is known as "stereolithography," which literally means "three-dimensional printing." In stereolithography, dimensional data generated in a CAD/CAM system is employed to "print" an object in a fully or near-fully automated fabrication system. The most commercially successful stereolithography method and apparatus is disclosed in a number of patents assigned to 3-D Systems Inc. of Valencia, Calif. The 3-D Systems method and apparatus employs CAD/CAM data to control a beam of radiant energy (laser). The beam of radiant energy is directed into a bath of radiantly (ultra-violet) cured liquid polymer (photopolymer) to selectively cure the polymer and thus build an object through accumulation of incremental layers of cured polymer. Thus, the three-dimensional printing is accomplished by selective curing of substantially two-dimensional layers of polymeric material.

Another method and apparatus for RP&M is disclosed in a series of patents assigned to the University of Texas. In this method, a CAD/CAM system is employed to control a laser, which selectively sinters particles of material, typically a plastic powder, to form the object through accumulation of incremental layers of sintered material.

Other known RP&M systems adhesively laminate together layers of polymeric or paper tape. Each layer is trimmed by a laser or other means to the cross-sectional dimensions of the object, wherein accumulation of layers of tape forms the fully fabricated object. A generic term for all of these RP&M apparatus is "free-form" fabricators.

A drawback to all of these methods is that the ultimate part or object, while in some respects satisfactory for model building, generally lacks the material properties desired of a satisfactory prototype part. For example, the parts resulting from the cured liquid polymer processes tend to be brittle. The parts resulting from the laser sintering process suffer from the porosity and strength problems typical of sintered parts.

One attempted solution to this problem is disclosed in a series of patents assigned to the University of Southern California. In this process, liquid metal is deposited in droplet form and the droplet stream is manipulated to form the object through accumulation and solidification of the metal droplets. This process results in a satisfactory metallic prototype part or object, but is extremely complex, even in the context of this complex technological area, is extremely expensive, and the control systems are not sufficiently developed to accurately and repeatably produce prototype parts with satisfactory dimensional tolerances.

A further drawback to these methods is that they are time-consuming and expensive, typically costing several hundred thousand dollars at initial purchase price. Unwieldy (tape and vats of liquid or powdered polymer) and hazardous (ultraviolet-cured photopolymers) materials are used in several of these processes. Moreover, these RP&M methods require relatively large apparatus operating under controlled conditions. Nevertheless, the time and expense consumed by these RP&M methods is small compared to the time and cost necessary to produce a prototype part using conventional tooling and manufacturing processes.

The previously mentioned 3-D Systems Inc. has advanced the state of RP&M technology with its Actua 2100™ modeler. This system uses an "ink-jet" technology to deposit layers of a waxy polymer to build up a model. This system is faster than laser-driven photopolymer or sintering systems, has a smaller "footprint" than prior stereolithography apparatus, and costs less than one hundred thousand dollars. Nevertheless, because the Actua 2100™ is confined by the "ink-jet" process that it uses to waxy polymers, there is room for improvement in the material properties of the resulting part.

A need exists, therefore, for a method of fabricating objects, employing free-form fabricators, that produces a prototype part having satisfactory material properties in a shorter time interval and using a less bulky apparatus.

SUMMARY OF THE INVENTION

It is a general purpose of the present invention to provide an improved method of three-dimensional object or part fabrication. This and other purposes of the present invention are achieved by determining the dimensional boundaries of the part in a computer CAD/CAM system, the dimensional boundaries including x, y, and z dimensions. A reference surface is provided and a first incremental layer of mold material is formed on the reference surface. The first incremental layer of mold material is selectively interrupted to define at least one dimensional boundary of the object. A first incremental layer of part material is formed upon at least the reference surface and assumes the dimensions defined by the interruption in the layer of mold material. The steps of forming incremental layers of mold and object material are repeated until the object or part is fully fabricated and all dimensional boundaries are defined.

According to a preferred embodiment of the present invention, the incremental layers of mold material are formed by a free-from fabricator employing an "ink-jet" droplet-deposition print head. The incremental layers of part material are electroformed of nickel or other metal.

Other objects, features, and advantages of the present invention will become apparent to those having skill in the art with reference to the detailed description, which follows.

DESCRIPTION OF THE PREFERRED EMBODIMENT

Figure 1:
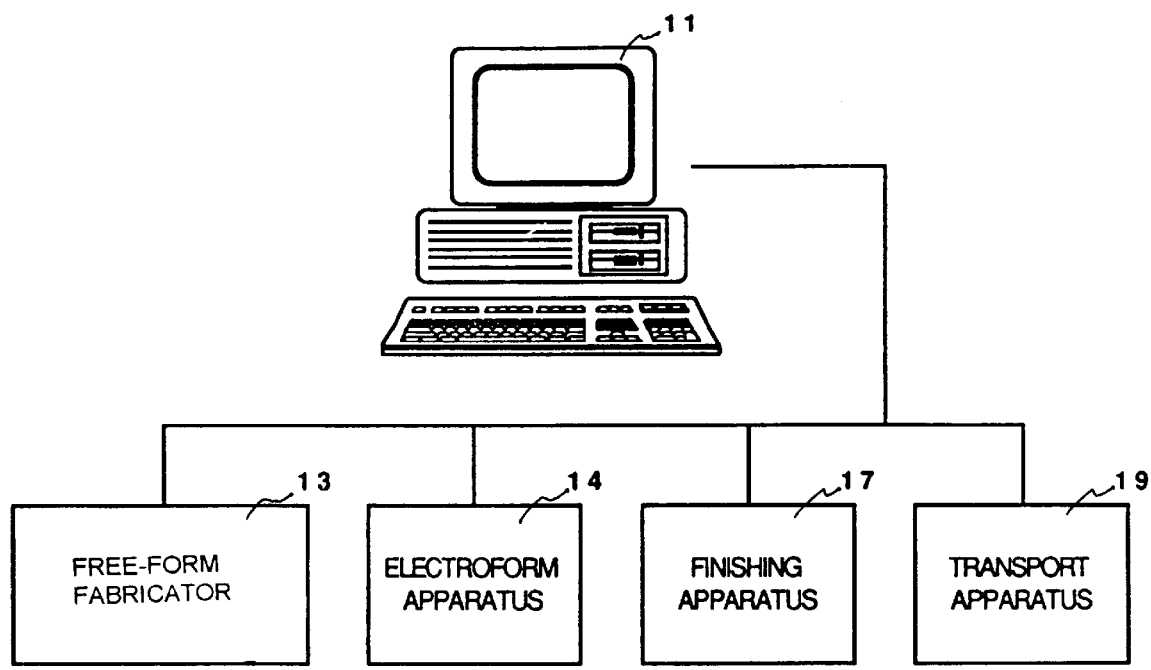
FIG. 1 is a block diagram schematically representing functional components of the apparatus employed in the method of the present invention.

Referring now to the Figures, and particularly to FIG. 1, functional components of an apparatus for use in implementing the method according to the present invention are illustrated in block diagram form. A central component is a computer system 11. Computer system 11 is depicted as a desk-top personal computer, but could include a client/server workstation, mainframe, distributed data processing system, or the like, so long as the system is adapted for centralized control and implementation of other functional components of the apparatus.

The other functional components include a free-form fabricator 13, an electroform apparatus 15, a finishing apparatus 17, and a transport apparatus 19. All components are coupled to computer 11 for control of each respective functional component 13, 15, 17, 19 in implementation of the method according to the present invention. The operation of and interrelation between the functional components will become apparent as the method of the present invention is described in greater detail below.

Figure 2:
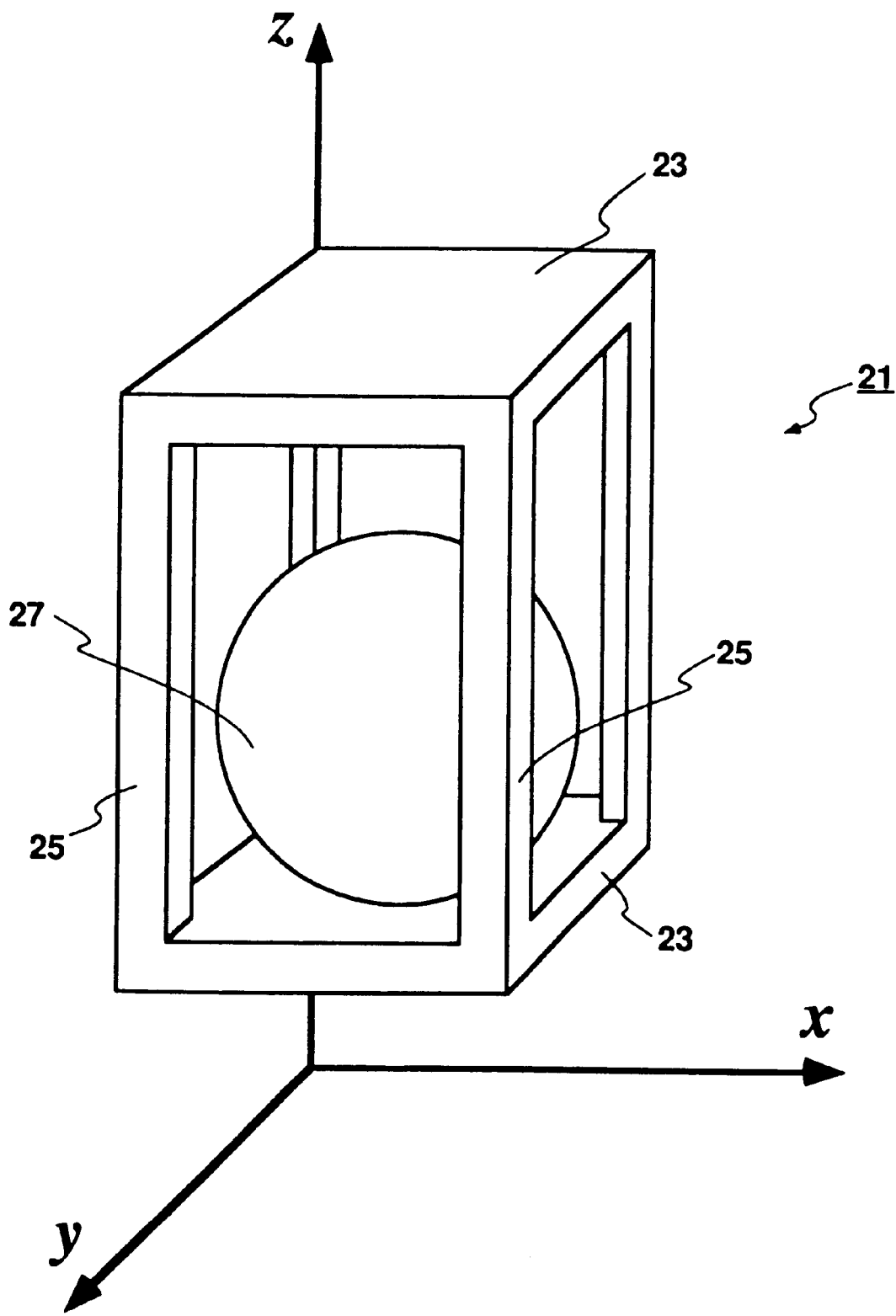
FIG. 2 is a perspective view of an exemplary object or part manufactured according to the method of the present invention.

FIG. 2 is a perspective view of a three-dimensional object 21 or part that is fabricated according to the method of the present invention. Object 21 comprises a pair of end pieces 23, which are connected by four columns 25. A spherical ball 27 is contained within the space defined by end pieces 23 and connecting columns 25. Object 21 is integrally formed, preferably of a metallic material. The intricate, part-within-a-part, nature of object 21 illustrates the intricacy of objects that can be formed with the method according to the present invention and the versatility of the method of the present invention. As with any three-dimensional object, object 21 has x, y, and z dimensional boundaries.

Before object 21 is fabricated, these dimensional boundaries can be obtained from data contained in a conventional CAD/CAM system with three-dimensional solid modeling capability, such as Pro/ENGINEER™, a CAD/CAM system sold by Parametric Technology Corporation of Waltham, Mass. Given a three-dimensional, solid model description of object 21 in a CAD/CAM system, the x, y, and z dimensional boundaries of the object can be determined appropriately for the method of the present invention in a conventional manipulation of the data to produce a negative description of the object to be fabricated. As is conventional in stereolithography, the x and y dimensional boundaries of object 21 are determined at each of a selected number of points along the z axis.

The incremental distance (dz) between each of the selected points on the z axis may be selected by the operator and in large part determines the intricacy of the object 21 that can be fabricated, and the quality of dimensional tolerance and surface finish that can be obtained. For example, to obtain a relatively smooth surface on a rounded object such as spherical member 27, increment dz for a single layer of mold material should be selected to be relatively small, on the order of 0.0005 inch or less. For generally straight-sided objects, the increment dz for a single layer of mold material is less critical. As used herein, the term dz refers to the z dimension of an incomplete fabricated part. As such, dz may refer to individual incremental layers making up a mold or object, or to an aggregation of such incremental layers (as shown in FIG. 3A).

With reference to FIGS. 1–3E, the method according to the present invention will be described. After determining and generating the dimensional boundaries of object 21 in the CAD/CAM system of computer 11, the dimensional data is downloaded from computer 11 to free-form fabricator 13. The downloaded data is manipulated and processed to a form appropriate for use by free-form fabricator 13. An example of such a form is the STL file format, which has become something of an industry standard in the field of RP&M. Other file formats may be appropriate depending on the free-form fabricator and computer systems employed in the process.

Figure 3A:
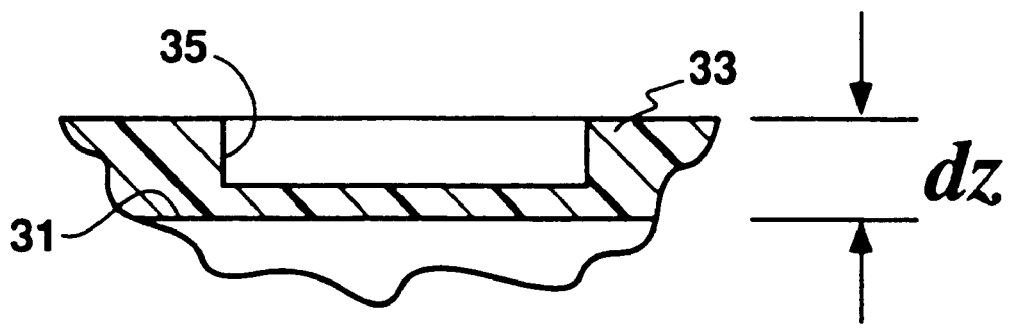
FIGS. 3A–3E are fragmentary section views illustrating the fabrication of a part according to the method of the present invention.

Free-form fabricator 13 is provided with a generally flat reference surface or build datum 31, as illustrated in FIG. 3A. Free-form fabricator 13 is employed to form a first incremental layer 33 of mold material of thickness dz (in FIG. 3A, several incremental layers 33 of mold material are depicted, and this may be preferable for some applications), determined previously along with other dimensional boundaries of object 21. Incremental layer of mold material 33 is selectively interrupted, wherein one or more interruptions 35 in layer 33 define the various x and y dimensional boundaries of object 21. Thus, mold layer 33 and the interruption (s) define a negative of the part or object to be fabricated.

According to one embodiment of the present invention, free-form fabricator 13 is the 3D-Systems model SLA-250, manufactured and sold by 3-D Systems Inc. of Valencia, Calif. This apparatus employs the previously mentioned CAD/CAM data to selectively form incremental layers of UV-curable liquid polymer.

Specifically, the SLA-250 employs an helium-cadmium (HeCd) laser to at least partially solidify or cure the UV-curable polymer on a build datum (31 in FIGS. 3A–3E), which is a platform moved up and down in a bath or vat of the UV-curable polymer. Photopolymer resins used in free-form fabricator 13 include both acrylate and epoxy formulations. A preferred photopolymer resin is Cibatool™ SL 5170 epoxy resin, which is available from Ciba-Geigy A. G., Fribourg, Switzerland, but other resins are available and improved resins are becoming available.

The SLA-250, because of the nature of the liquid polymer employed therein, requires an additional post-cure step in an ultraviolet oven to fully cure incremental layer 33. At some point in the build or fabrication process, platform or build datum 31 and incremental layer or layers 33 may be removed from free-form fabricator 13 and subjected to the post-cure process.

According to the preferred embodiment of the present invention, free-form fabricator 13 is an Actua™ 2100 apparatus manufactured and sold by 3-D Systems Inc. The Actua™ 2100 employs a "multi-jet modeling" process in which incremental layers of model material are deposited or formed using a technique similar to "ink-jet" phase-change printing. In this process, a "print head" having 96 jets arranged in a linear array "prints" or deposits (in droplet form) successive layers of a thermopolymer material to form a model of a part or object. The "print head" moves in one dimension (x) while the platform or build datum moves in two dimensions (y and z) to define incremental layers having the dimensions of the model.

The process employed by the Actua™ 2100 is faster and more efficient than the SLA-250 because of the raster-scan (as opposed to the point-to-point vector-scan mode of the SLA-250) method of moving the "print head" and platform to deposit the layers of model material and the elimination of photopolymers requiring a post-cure step. Nevertheless, the cured thermopolymer resulting from the Actua™ process alone generally lacks the physical and mechanical properties of parts fabricated using the SLA-250 alone. Because of its speed and efficiency, the Actua™ 2100 is well-adapted for use in the method or process according to the present invention, in which the material from the Actua™ 2100 serves as the mold material (the part or object material being formed in another step and by another apparatus).

An apparatus similar to the Actua™ 2100 is manufactured by Sanders Prototype, Inc. of Wilton, N.H. under the name Model-Maker™ II. Both the Model-Maker™ II and Actua™ 2100 are capable of forming incremental layers of object material of thickness on the order of 0.0005 inch. Thus, these ink-jet or droplet deposition processes are capable of forming intricate molds and excellent surface finishes in the method or process according to the present invention.

In addition to the Actua™ 2100 and Model-Maker™ II, which both employ droplet deposition of waxy thermopolymers, MicroFab Technologies of Plano, Tex. has ink-jet print head technology that dispenses droplets of solder or similar low-melting temperature metals and alloys. Thus, the layer of mold material can be formed of a low-melting temperature metal and metal alloy that is electrically conductive, thus eliminating the necessity for metallizing (discussed below) entirely. Additionally, forming the layers of mold material from metal or metal alloy yields a stronger mold material that is capable of resolving finer structural details than the polymeric mold materials.

Transport apparatus 19 may be one of a variety of robotic or automated devices that is computer controllable to move a pallet consisting of at least build datum 31 and incremental layers of partially formed object 21 between the various functional components 13, 15, 17, of the apparatus for implementation of the method according to the present invention. Alternatively, transport apparatus could move other apparatus around and about free-form fabricator 13 and the workpiece comprising build datum 31 and layer or layers 33.

Figure 3B:
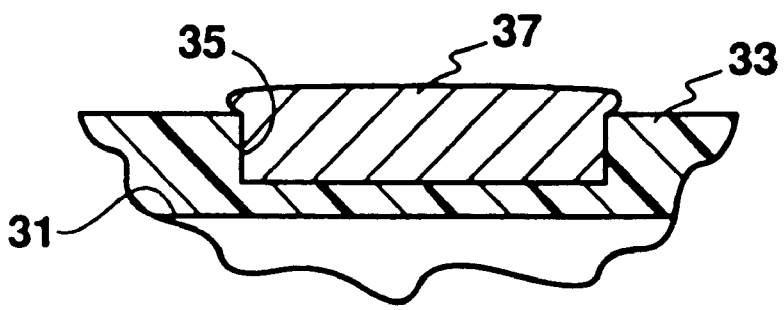

FIG. 3B depicts, in fragmentary section view, the result of the next step of the method according to the present invention, in which a first incremental layer of object material 37 is formed on or over at least interruption 35 in layer of mold material 33. In this step, the layer of object material 37 assumes the dimensions defined by interruption 35 in the layer of mold material 33. Again, this step necessitates that at least build datum surface 31 and incremental layer of mold material 33 be moved from free-form fabricator 13 to electroform apparatus 15 or vice-versa.

According to one embodiment of the present invention, incremental layer of object material 37 is formed by an electroforming process. Electroforming is a conventional process that is similar to electroplating in that it occurs in an electrolytic solution containing ions of the metal to be deposited and is driven by an anode and cathode arrangement in which the cathode, or negatively charged object in the solution, bears a negative image of the object to be formed. An electrical charge on the cathode attracts the metallic ions, which are deposited on the cathode and accumulate over time to form a layer of metal having a positive relief of the contours of the cathode.

Because electroforming occurs on a molecular level, the resulting layer of metal has excellent material properties. Typically in electroform operations, the cathode is known as a mandrel. In the present invention, incremental layers of mold material 33 serve as the cathode or mandrel, and electroformed incremental layers of object material 37 adopt or assume the configuration of incremental layers of mold material 33, including at least one interruption 35.

In place of or in conjunction with electroforming, other processes may be suitable for forming layers of object or part material of metals and metal alloys, as well as of other materials (either in lieu of metallic mold materials or in combination with them). For example, chemical vapor deposition (CVD) and similar processes may be used to deposit ceramic materials such as diamond or polycrystalline diamond. For elevated process temperatures such as those encountered in some CVD processes, metal or metal alloy mold material should be used.

According to a preferred embodiment of the present invention, incremental layers of object material 37 are formed of nickel. Nickel is preferred because it is readily adapted for electroform procedures and generally has satisfactory material properties for most prototype object applications. Alternative materials include copper and iron and may be more appropriate for certain applications. Additionally, composite object materials can be obtained by varying the electroforming process. For example, a layer or portion of a layer may be formed of copper to provide a bearing or bushing surface in an otherwise nickel object or part. By varying the elecroforming process, a wide variety of composite object materials having combinations of properties can be formed. In some applications, a layer of mold material may be retained in the layers of object material to take advantage of desirable material properties of the mold material itself. Moreover, externally fabricated components can be encapsulated or otherwise incorporated into the object or part during the fabrication process to increase the functionality of the finished object.

If the first incremental layer of mold material 33, which serves as the mandrel, is formed of polymeric material, the mold material must be metallized or otherwise rendered electrically conductive for layer 33 to perform its role as a cathode in electroform apparatus 15. This step is conventional in electroforming and permits the appropriate surfaces of mold material 33 to become electrically charged, thus facilitating the formation of layer of object material 37 on the appropriate surfaces of layer of mold material 33 and interruption 35.

Metallizing can be accomplished in a number of ways, including spraying a metallic compound or solution on the area to be metallized. Metallizing can also be accomplished by blending a conductive material with the polymer dispensed or deposited by free-form fabricator 13.

According to one embodiment of the present invention, all of the uppermost surfaces of incremental layer of mold material 33 are metallized, including the sidewalls defined by interruption 35. Metallizing is removed from the uppermost surface of layer 33 prior to electroforming in a process similar to the finishing step described below to avoid unnecessary formation of object material thereon. Alternatively, metallizing is applied selectively only to the sidewalls defined by interruption 35 because it is redundant to metallize the metallic surface provided by layer of object material 37. Masking operations may be necessary or desirable to prevent selected surfaces from becoming conductive. More background information on electroforming technology can be found in *Electroplating Engineering Handbook*, A. Kenneth Graham, (Van Nostrand Reinhold, 3d. Ed. 1971) and *Practical Electroplating Handbook*, N. V. Parthasaradhy (Prentice Hall, 1989).

After incremental layer of object material 37 is formed over and on first layer of mold material 33, its uppermost surface may be machined, ground, or otherwise rendered dimensionally flat and parallel to build datum or platform 31 in finishing apparatus 17. The finishing step provides a new reference surface 41 on which subsequent layers of object and mold material can be formed. For dimensional accuracy, second reference surface 41 should be flat and parallel to platform or build datum 31. If sufficient control is exercised over the dz dimension during fabrication of object and mold layers, the need for finishing can be reduced or eliminated entirely. Moreover, the finishing operation may be applied selectively, as needed, and need not be repeated with each layer of object material.

Finishing apparatus 17 is one of any number of conventional numerically controlled grinders, mills, or other machine tools. Finishing apparatus 17 also includes a vacuum or similar device for removing chips and debris resulting from the finishing operation. Again, this finishing step necessitates that a pallet consisting of at least build datum 31 and layers of mold and object material 33, 37 be moved by transport apparatus 19 between electroform apparatus 15 and finishing apparatus 17.

Figure 3C:
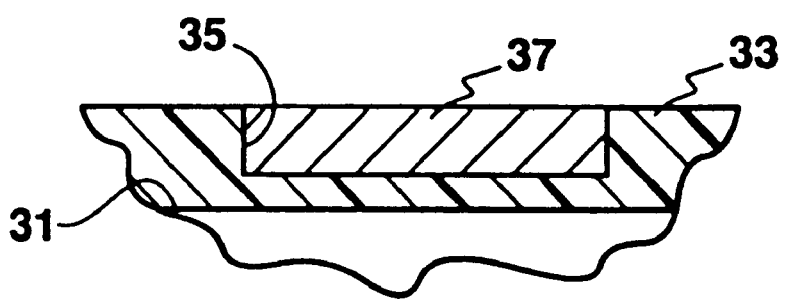
Figure 3D:
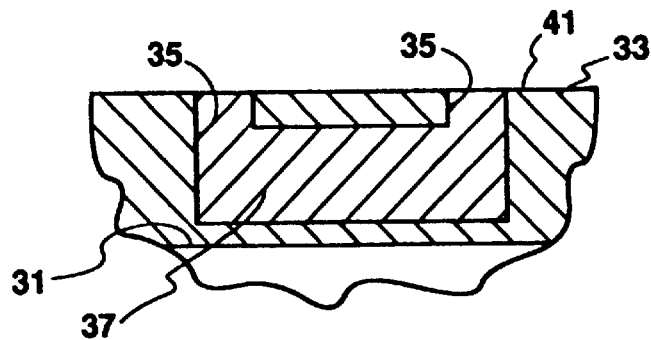
Figure 3E:
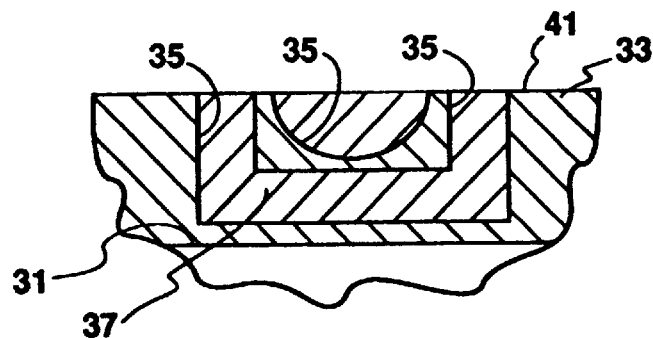
Figure 4:
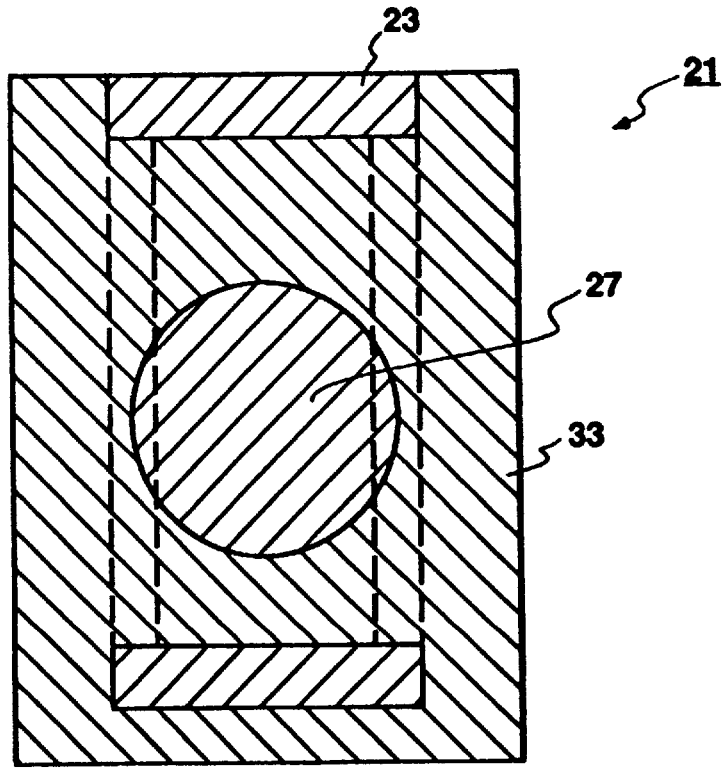
FIG. 4 is a longitudinal cross section of the part of FIG. 2, prior to the step of removing the incremental layers of mold material from the fully fabricated part.

The steps represented by FIGS. 3A–3C are repeated, substantially identically as disclosed before, until all dimensional boundaries of object 21, including the x, y, and z dimensions, are fully defined, and object 21 is fully fabricated, as illustrated in FIG. 4. FIGS. 3D and 3E illustrate the result of subsequent formation of layers of object and mold material. FIG. 3D illustrates the formation of the columns of the object, and FIG. 3E illustrates formation of a portion of the spherical ball of the object.

In the method steps subsequent to the formation of the first incremental layers of mold and object material 33, 37, the metallic and electrically conductive layer of object material 37 will form a portion of second build datum 41 and largely eliminates the necessity of the metallizing step of the electroforming process. However, metallizing may remain advantageous for certain object features, particularly at the sidewalls defined by interruption 35.

FIG. 4 illustrates fully formed object 21, including spherical member 27 and end pieces 23, encased in mold material 33 produced by the method according to the present invention. Thus, as a final step, mold material 33 must be removed to permit access to and full function of object 21. Depending upon the polymer employed in free-form fabricator 13, a number of methods of removal may be employed. For example, if mold material 33 is a polymer that degrades upon exposure to heat or a low-melting temperature metal or metal alloy, mold material 33 may simply be melted away. Other polymeric materials may necessitate acid-bath removal, bead or sand blasting, grinding, or other similar material removal operations. When mold material 33 is removed, a fully formed and functional nickel object 21, substantially as illustrated in FIG. 2, remains.

Figure 5:
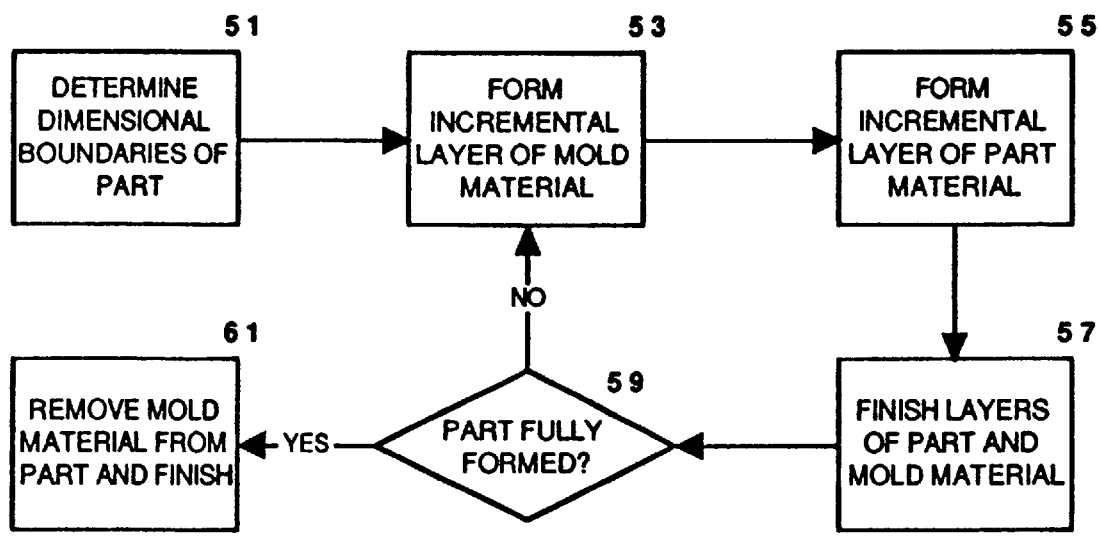
FIG. 5 is a flow chart schematically representing the steps of the method according to the present invention.

In summary, FIG. 5 is a flow chart depicting the principal operative steps of the method according to the present invention. Block 51 represents the step of determining the dimensional boundaries of the object or part employing CAD/CAM system in computer 11. A first incremental layer of mold material is formed in free-form fabricator 13, as represented by block 53. Next, a first incremental layer of object or part material is formed in electroform apparatus 15, as denoted by block 55. Then, the layers of object or part and mold material may be finished to form a new reference surface in finishing apparatus 17, as represented by block 57. It is unnecessary that the steps of forming layers of mold material and object or part material alternate strictly. In some applications, it may be desirable to form several layers of mold material prior to formation of a layer of object or part material. Whether multiple layers of mold material can be formed prior to formation of a layer of object material depends largely on the geometry of object being fabricated and the formation processes being used.

The finishing step may be unnecessary (if sufficient control over the dz dimension is exercised in the steps of forming layers of mold and object material), or may be selectively applied between successive fabrications of layers of mold and object material. The steps represented by block 53–57 are repeated until all dimensional boundaries of the object are defined, as indicated by block 59. Finally, the incremental layers of mold material encasing the object are removed to reveal a fully fabricated object having a surface finish, dimensional tolerances, and material properties that are generally improved over the prior art, as represented by block 61.

The principal advantage of the present invention is that it provides an improved method of rapid prototyping and manufacturing of objects having suitable properties for use as a prototype, if not a production part. Because of the iterative and repetitive nature of the method according to the present invention, it is particularly adapted to automated computer control. Additionally, because individual functional components of the apparatus for implementing the method are presently subject to computer control, the method according to the present inventions is particularly adapted to be centrally controlled by a single computer or a distributed data processing system.

Moreover, implementation of ink-jet droplet deposition methods and apparatus for depositing incremental layers of mold material increases the speed and reduces the complexity of the method over that employing the photopolymer stereolithography method.

The invention has been described with reference to a preferred embodiment thereof. It will be apparent to those skilled in the art that the present invention is susceptible to variation and modification without departing from the scope of the invention.

I claim:

1. A method of forming an object from incremental layers of object material, the method comprising the steps of:

providing x, y and z dimensions of the object in a machine-readable format;

forming a layer of mold material on a datum surface, the layer of mold material defining at least a portion of the x and y dimensions of the object;

a) forming a layer of the object material over the layer of mold material, wherein the layer of object material assumes the dimensions defined by the layer of mold material;

b) forming another layer of mold material on the first layers of mold and object material, said another layer of mold material defining further dimensions of the object; and repeating steps a) and b) until the object is fully formed.

2. The method according to claim 1 wherein the datum surface is a flat surface.

3. The method according to claim 1 wherein the layers of mold material are deposited by ink-jet deposition.

4. The method according to claim 1 wherein the layers of object material are formed by electroforming.

5. The method according to claim 4 further comprising the step of selectively applying a non-conductive material to conductive mold material to define areas of mold material that will not be receptive to the electroforming process.

6. The method according to claim 4 further comprising the step of selectively applying a conductive material to non-conductive mold material to define areas of mold material that will be receptive to the electroforming process.

7. The method according to claim 1 wherein the layers of object material are formed by chemical vapor deposition.

8. The method according to claim 1 wherein at least two layers of object material are formed of different materials.

9. The method according to claim 1 wherein at least one layer of object material comprises a metallic material.

10. The method according to claim 1 wherein at least one layer of object material comprises a nickel material.

11. The method according to claim 1 wherein at least one layer of object material comprises a ceramic material.

12. The method according to claim 1 wherein at least one layer of object material comprises more than one metallic material.

13. The method according to claim 1 wherein at least one layer of object material comprises a plurality of materials, wherein the resulting object has a composite structure.

14. The method according to claim 1 wherein at least one layer of object material is formed by more than one type of deposition process.

15. The method according to claim 1 wherein the layers of object material are formed by more than one type of deposition process.

16. The method according to claim 1 wherein at least one layer of mold material comprises a waxy polymer.

17. The method according to claim 1 wherein at least one layer of mold material comprises a metallic material.

18. The method according to claim 1 wherein at least one layer of mold material comprises a plurality of materials.

19. The method according to claim 1 wherein at least one layer of mold material comprises a conductive material and a non-conductive material.

20. The method according to claim 1 wherein at least two layers of mold material are formed of different materials.

21. The method according to claim 1 wherein the layers of mold material are formed by more than one free form fabrication process.

22. The method according to claim 1 further comprising the step of:

selectively finishing the layers of object and mold material to be generally parallel to the build datum.

23. The method according to claim 1 further comprising the step of incorporating externally fabricated components into the object.

24. The method according to claim 1 further comprising the step of at least partially removing the layers of mold material from the fully formed object.

25. The method according to claim 1 further comprising the step of only partially removing the layers of mold material from the fully formed object, wherein the remaining mold material becomes part of the object.

26. A method of forming an object from incremental layers of object material, the method comprising the steps of:

providing x, y and z dimensions of the object in a machine-readable format in a computer system;

depositing a layer of mold material on a datum surface, the layer of mold material defining at least a portion of the x and y dimensions of the object;

electroforming a layer of object material over the layer of mold material, wherein the layer of object material assumes the dimensions of the object defined by the layer of mold material;

depositing another layer of mold material on the first layers of mold and object material, said another layer of mold material defining further x and y dimensions of the object;

continuing to deposit and electroforming layers of mold and object material until the object is fully formed; and at least partially removing the layers of mold material from the fully formed object.

27. The method according to claim 26 wherein the datum surface is a flat surface.

28. The method according to claim 26 wherein the layers of mold material are deposited by ink-jet deposition.

29. The method according to claim 26 further comprising the step of selectively applying a non-conductive material to conductive mold material to define areas of mold material that will not be receptive to the electroforming process.

30. The method according to claim 26 further comprising the step of selectively applying a conductive material to non-conductive mold material to define areas of mold material that will be receptive to the electroforming process.

31. The method according to claim 26 wherein the layers of object material are formed of different materials.

32. The method according to claim 26 wherein at least one layer of object material comprises a metallic material.

33. The method according to claim 26 wherein at least one layer of object material comprises a ceramic material.

34. The method according to claim 26 wherein at least one layer of object material comprises more than one metallic material.

35. The method according to claim 26 wherein at least one layer of object material comprises a plurality of materials, wherein the resulting object has a composite structure.

36. The method according to claim 26 further comprising the step of forming at least one layer of object material by a free form fabrication process.

37. The method according to claim 26 wherein at least one layer of mold material comprises a waxy polymer.

38. The method according to claim 26 wherein at least one layer of mold material comprises a metallic material.

39. The method according to claim 26 further comprising the step of:

selectively finishing the layers of object and mold material to be generally parallel to the build datum.

40. The method according to claim 26 further comprising the step of incorporating externally fabricated components into the object.

41. A method of forming an object from incremental layers of object material, the method comprising the steps of:

providing x, y, and z dimensions of the object in a machine-readable format;

forming a layer of mold material from an array of dispensing jets, wherein the layer of mold material defines at least x and y dimensions of the object;

forming a layer of object material over and on the layer of mold material, wherein the layer of object material at least partially assumes the dimensions defined by the layer of mold material; and repeating the steps of forming layers of mold and object material until the object is fully formed of layers of object material.

42. The method according to claim 41 wherein the datum surface is a flat surface.

43. The method according to claim 41 wherein the layers of object material are formed by electroforming.

44. The method according to claim 43 further comprising the step of selectively applying a non-conductive material to conductive mold material to define areas of mold material that will not be receptive to the electroforming process.

45. The method according to claim 43 further comprising the step of selectively applying a conductive material to non-conductive mold material to define areas of mold material that will be receptive to the electroforming process.

46. The method according to claim 41 wherein the layers of object material are formed by chemical vapor deposition.

47. The method according to claim 41 wherein at least two layers of object material are formed of different materials.

48. The method according to claim 41 wherein at least one layer of object material comprises a metallic material.

49. The method according to claim 41 wherein at least one layer of object material comprises a nickel material.

50. The method according to claim 41 wherein at least one layer of object material comprises a ceramic material.

51. The method according to claim 41 wherein at least one layer of object material comprises more than one metallic material.

52. The method according to claim 41 wherein at least one layer of object material comprises a plurality of materials, wherein the resulting object has a composite structure.

53. The method according to claim 41 wherein the layers of object material are formed by more than one type of deposition process.

54. The method according to claim 41 wherein at least one layer of mold material comprises a waxy polymer.

55. The method according to claim 41 wherein at least one layer of mold material comprises a metallic material.

56. The method according to claim 41 further comprising the step of:

selectively finishing the layers of object and mold material to be generally parallel to the build datum.

57. The method according to claim 41 further comprising the step of incorporating externally fabricated components into the object.

58. The method according to claim 41 further comprising the step of at least partially removing the layers of mold material from the fully formed object.

59. The method according to claim 41 further comprising the step of only partially removing the layers of mold material from the fully formed object, wherein the remaining mold material becomes part of the object.

60. A method of forming an object from incremental layers of object material, the method comprising the steps of:

providing x, y, and z dimensions of the object in a machine-readable format;

utilizing the x, y, and z dimensions to control relative movement between a deposition apparatus and a platform;

depositing mold material onto the platform from the deposition apparatus, wherein the mold material defines at least x and y dimensions of the object;

forming a layer of object material over and on the mold material, wherein the layer of object material at least partially assumes the dimensions defined by the layer of mold material;

repeating the steps of depositing mold material and forming object material until the object is fully formed of layers of object material; and at least partially removing the layers of mold material from the fully formed object.

61. The method according to claim 60 wherein the datum surface is a flat surface.

62. The method according to claim 60 wherein the layers of object material are formed by electroforming.

63. The method according to claim 62 further comprising the step of selectively applying a non-conductive material to conductive mold material to define areas of mold material that will not be receptive to the electroforming process.

64. The method according to claim 62 further comprising the step of selectively applying a conductive material to non-conductive mold material to define areas of mold material that will be receptive to the electroforming process.

65. The method according to claim 60 wherein the layers of object material are formed by chemical vapor deposition.

66. The method according to claim 60 wherein at least two layers of object material are formed of different materials.

67. The method according to claim 60 wherein at least one layer of object material comprises a metallic material.

68. The method according to claim 60 wherein at least one layer of object material comprises a nickel material.

69. The method according to claim 60 wherein at least one layer of object material comprises a ceramic material.

70. The method according to claim 60 wherein at least one layer of object material comprises more than one metallic material.

71. The method according to claim 60 wherein at least one layer of object material comprises a plurality of materials, wherein the resulting object has a composite structure.

72. The method according to claim 60 wherein the layers of object material are formed by more than one deposition process.

73. The method according to claim 60 wherein at least one layer of mold material comprises a waxy polymer.

74. The method according to claim 60 wherein at least one layer of mold material comprises a metallic material.

75. The method according to claim 60 wherein at least one layer of mold material comprises a plurality of materials.

76. The method according to claim 60 wherein at least one layer of mold material comprises a conductive material and a non-conductive material.

77. The method according to claim 60 wherein at least two layers of mold material are formed of different materials.

78. The method according to claim 60 wherein at least one layer of mold material is formed by a plurality of free form fabrication processes.

79. The method according to claim 60 wherein at least two layers of mold material are formed by different free form fabrication processes.

80. The method according to claim 60 further comprising the step of:

selectively finishing the layers of object and mold material to be generally parallel to the build datum.

81. The method according to claim 60 further comprising the step of incorporating externally fabricated components into the object.

82. The method according to claim 60 further comprising the step of only partially removing the layers of mold material from the fully formed object, wherein the remaining mold material becomes part of the object.

* * * * *